United States Patent
Oshima

(10) Patent No.: US 7,313,516 B2
(45) Date of Patent: Dec. 25, 2007

(54) ELECTRONIC DICTIONARY CLIENT CONNECTABLE TO AN ELECTRONIC DICTIONARY SERVER TO SEARCH A DICTIONARY ON THE ELECTRONIC DICTIONARY SERVER

(75) Inventor: Jun Oshima, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 397 days.

(21) Appl. No.: 10/843,963

(22) Filed: May 11, 2004

(65) Prior Publication Data

US 2004/0210435 A1 Oct. 21, 2004

Related U.S. Application Data

(63) Continuation of application No. PCT/JP03/09266, filed on Jul. 22, 2003.

(30) Foreign Application Priority Data

Jul. 24, 2002 (JP) ............................. 2002/215479

(51) Int. Cl.
*G06F 17/21* (2006.01)
(52) U.S. Cl. ........................................ 704/10; 704/251
(58) Field of Classification Search .................. 704/10, 704/251
See application file for complete search history.

(56) References Cited

U.S. PATENT DOCUMENTS 5,418,957 A * 5/1995 Narayan ..................... 717/113
5,584,026 A * 12/1996 Knudsen et al. ............... 707/1
5,586,329 A * 12/1996 Knudsen et al. ............. 717/108
5,586,330 A * 12/1996 Knudsen et al. ............. 717/136
5,594,899 A * 1/1997 Knudsen et al. ............... 707/2

(Continued)

FOREIGN PATENT DOCUMENTS

CN 1356649 A 7/2002

(Continued)

OTHER PUBLICATIONS

Douglis, F. Et al. "HPP: HTML Macro-Preprocessing to Support Dynamic Document Caching" Usenix Symposium on Internetworking Technologies and Systems; XP-002162124, Dec. 8-11, 1997, Montery, CA, USA, pp. 83-95.

*Primary Examiner*—Michael Opsasnick
(74) *Attorney, Agent, or Firm*—Frishauf, Holtz, Goodman & Chick, P.C.

(57) ABSTRACT

In dictionary retrieval processing by the electronic dictionary, if a headword matching a retrieval object word is not stored in a built-in dictionary data, the retrieval object word is registered in the form of a network-dictionary retrieval object listing. If a network dictionary retrieval is performed through connection to the dictionary server, a dictionary storing the registered retrieval word is retrieved in the dictionary server, is transmitted to the electronic dictionary, and is displayed. When the displayed dictionary in the network dictionary retrieval is selected, dictionary data is retrieved from the target of the selected dictionary, the dictionary contents corresponding to the retrieval word retrieved in the dictionary server is transmitted to the user electronic dictionary and is displayed. When update of a dictionary is instructed, data of the dictionary is transmitted and downloaded into the dictionary server, and built-in dictionary data is thereby updated and stored.

3 Claims, 13 Drawing Sheets

U.S. PATENT DOCUMENTS

| | | | | |
|---|---|---|---|---|
| 5,596,752 A | * | 1/1997 | Knudsen et al. | 717/117 |
| 5,682,535 A | * | 10/1997 | Knudsen | 717/117 |
| 5,940,594 A | | 8/1999 | Ali et al. | |
| 5,960,449 A | * | 9/1999 | Nagaoka et al. | 715/532 |
| 6,212,518 B1 | * | 4/2001 | Yoshida et al. | 707/5 |
| 6,282,508 B1 | * | 8/2001 | Kimura et al. | 704/10 |
| 6,345,245 B1 | * | 2/2002 | Sugiyama et al. | 704/10 |
| 6,961,722 B1 | * | 11/2005 | Bruecken | 707/3 |
| 6,964,018 B1 | * | 11/2005 | Masui | 715/530 |
| 6,985,861 B2 | * | 1/2006 | Van Thong et al. | 704/254 |

FOREIGN PATENT DOCUMENTS

| | | |
|---|---|---|
| EP | 1209581 A2 | 5/2002 |
| GB | 2 336 694 A | 10/1999 |
| GB | 2367393 A | 4/2002 |
| JP | 3-53377 A | 3/1991 |
| JP | 4-205059 A | 7/1992 |
| JP | 4-205060 A | 7/1992 |
| JP | 10-105480 | 4/1998 |
| JP | 2000-347961 | 12/2000 |
| JP | 2001-282789 A | 10/2001 |
| JP | 2002-247646 A | 8/2002 |
| KR | 2002-0006129 A | 1/2002 |
| WO | WO 01/57665 A2 | 8/2001 |
| WO | WO 02/25902 A1 | 3/2002 |
| WO | WO 02/28059 A2 | 4/2002 |

* cited by examiner

```
                                                              G3a
   ┌────────────────────────────────────────────────┐
   │        <<BBa ENGLISH-ENGLISH DICTIONARY>>      │
   │ RETRIEVAL        ┌──────────────┐              │
   │ CHARACTER (S)?   │ copyleft     │              │
   │                  └──────────────┘              │
   │  ┌──────────────────────────────────────────┐  │
   │  │ <NETWORK DICTIONARY RETRIEVAL> APPLICABLE│  │
   │  │ DICTIONARIES 2                           │  │
   │  │ BBb ENGLISH-ENGLISH DICTIONARY 100 CHARACTERS│
   │  │ BBc ENGLISH-ENGLISH DICTIONARY  10 CHARACTERS│
   │  │                                          │  │
   │  └──────────────────────────────────────────┘  │
   │                                                │
   │  SELECT NETWORK DICTIONARY NAME                │
   │  YOU CAN FREELY USE THREE MORE TIMES INCLUDING │
   │  THE PRESENT ONE.                              │
   │                                                │
   └────────────────────────────────────────────────┘
```

FIG.9A

```
                                                              G3b
   ┌────────────────────────────────────────────────┐
   │        <<BBa ENGLISH-ENGLISH DICTIONARY>>      │
   │ RETRIEVAL        ┌──────────────┐              │
   │ CHARACTER (S)?   │ copyleft     │              │
   │                  └──────────────┘              │
   │  ┌──────────────────────────────────────────┐  │
   │  │ <NETWORK DICTIONARY RETRIEVAL> APPLICABLE│  │
   │  │ DICTIONARIES 2                           │  │
   │  │ BBb ENGLISH-ENGLISH DICTIONARY 100 CHARACTERS│
   │  │ BBc ENGLISH-ENGLISH DICTIONARY  10 CHARACTERS│
   │  │                                          │  │
   │  └──────────────────────────────────────────┘  │
   │                                                │
   │  SELECT NETWORK DICTIONARY NAME                │
   │  YOU CAN USE  AT YEN 20/TIME.                  │
   │                                                │
   │  CURRENT NUMBER OF USAGE TIMES 15              │
   │                                                │
   │                       (PAID AMOUNT 300 YEN)    │
   └────────────────────────────────────────────────┘
```

FIG.9B

<<BBa ENGLISH-ENGLISH DICTIONARY>>

RETRIEVAL CHARACTER (S)? copyleft

<NETWORK DICTIONARY RETRIEVAL> BBb ENGLISH-ENGLISH DICTIONARY

<<COMPUTER>> COPYLEFT <<A COPYRIGHT USED FOR SOFTWARE FREELY DISTRIBUTED ...

DICTIONARY UPDATE IS DESIRED?

YES    NO

FIG.9C

<NETWORK DICTIONARY UPDATE> BBb ENGLISH-ENGLISH DICTIONARY

CURRENT ENGLISH-ENGLISH DICTIONARY: BBa ENGLISH-ENGLISH DICTIONARY
TRADE-IN PRICE    1000 YEN

ENGLISH-ENGLISH DICTIONARY TO NEWLY INPUT

| | NOS. OF RETRIEVALS | PRICE |
|---|---|---|
| BBb ENGLISH-ENGLISH DICTIONARY | 6 | 5000 YEN |
| BBc ENGLISH-ENGLISH DICTIONARY | 2 | 2000 YEN |

UPDATE FEE    4000 YEN

SPECIFY USING ▲/▼, THEN DEPRESS [EXECUTE] KEY.

FIG.9D

| <NETWORK DICTIONARY UPDATE> BBb ENGLISH-ENGLISH DICTIONARY |

| CURRENT ENGLISH-ENGLISH DICTIONARY | BBa ENGLISH-ENGLISH DICTIONARY | |
|---|---|---|
| | TRADE-IN PRICE | 1000 YEN |
| | PAID AMOUNT | 300 YEN |

ENGLISH-ENGLISH DICTIONARY TO NEWLY INPUT

| | NOS. OF RETRIEVALS | PRICE |
|---|---|---|
| BBb ENGLISH-ENGLISH DICTIONARY | 6 | 5000 YEN |
| BBc ENGLISH-ENGLISH DICTIONARY | 2 | 2000 YEN |
| | UPDATE FEE | 3700 YEN |

SPECIFY USING ▲/▼, THEN DEPRESS [EXECUTE] KEY.

| <NETWORK DICTIONARY UPDATE> BBb ENGLISH-ENGLISH DICTIONARY |

ENTER YOUR CREDIT NUMBER.

1234223 · ·

ENTER YOUR PASSWORD.

\*\*\*\*\*\*\*

DICTIONARY DATA UPDATE WILL START.
(ABOUT 3 MIN. IS REQUIRED.)

UPDATE HAS BEEN COMPLETED.

THANK YOU FOR USING THE SERVICES.

ELECTRONIC DICTIONARY CLIENT CONNECTABLE TO AN ELECTRONIC DICTIONARY SERVER TO SEARCH A DICTIONARY ON THE ELECTRONIC DICTIONARY SERVER

CROSS-REFERENCE TO RELATED APPLICATIONS

This is a Continuation Application of PCT Application No. PCT/JP03/09266, filed Jul. 22, 2003, which was not published under PCT Article 21(2) in English.

This application is based upon and claims the benefit of priority from prior Japanese Patent Application No. 2002-215479, filed Jul. 24, 2002, the entire contents of which are incorporated herein by reference.

BACKGROUND OF THE INVENTION

1. Field of the Invention

The present invention relates to an electronic dictionary terminal, electronic dictionary server, and recording medium that update dictionary contents in the electronic dictionary terminal.

2. Description of the Related Art

Conventionally, various book-type dictionaries have generally been used, including English-Japanese dictionaries, Japanese-English dictionaries, and Japanese dictionaries, for example. In recent years, however, electronic dictionaries are widely used because of, for example, their portability, and word retrievability.

Electronic dictionaries can be categorized into various types, most of which have specifications unique to one another depending on, for example, the contents and the volume of built-in dictionaries, the size of an apparatus housing, and the size of display screen. These dictionaries are sold as models independent of each other.

To purchase an electronic dictionary, a user confirms specifications of individual models of such electronic dictionaries at stores, through catalogs, and/or in other ways to find a model suitable to the user's demand.

As such, the contents of such conventional electronic dictionaries are fixed in units of the model. For example, suppose a user purchased a student-dedicated model containing, for example, an "archaic word dictionary" in school days of the user; and having grown to an adult, the user needs to purchase a high-level dictionary, such as an "English-English dictionary." In this case, the user has to purchase a new higher-order model. This is a problem of making it extremely wasteful.

BRIEF SUMMARY OF THE INVENTION

The present invention is directed to an electronic dictionary terminal, electronic dictionary server, recording medium storing an electronic-dictionary-terminal processing program, and recording medium storing an electronic-dictionary-server processing program that enable dictionary retrievability to be enhanced without requiring a different model to be purchased.

According to an embodiment of the present invention, an electronic dictionary terminal connected via a communication network to a dictionary server comprising a first storage device which stores headwords and description contents of the headwords, the electronic dictionary terminal comprises:

a second storage device which stores headwords and description contents of the headwords;

an input unit which inputs a retrieval object word;

a determining unit which determines whether a headword corresponding to the retrieval object word is stored in the second storage device;

a display device which displays the description contents of the headword corresponding to the retrieval object word and stored in the second storage device when the determining unit determines that the headword corresponding to the retrieval object word is stored in the second storage device;

a requesting unit which transmits the retrieval object word to the dictionary server and issues a retrieval request to the dictionary server to retrieve a headword corresponding to the retrieval object word and stored in the first storage device when the determining unit determines that the headword corresponding to the retrieval object word is not stored in the second storage device; and a receiving unit which receives dictionary data comprising the retrieved headword corresponding to the retrieval object word from the dictionary server.

When retrieval of a headword not contained in the second storage device is desired, a network dictionary containing a headword matching the retrieval object word may be easily and securely received from the first storage device of the dictionary server.

Moreover, the receiving unit comprises:

a receiver which receives retrieval information regarding a size of the retrieved headword included in dictionary data and corresponding to the retrieval object word;

a display which displays the retrieval information; and an instruction unit which issues an instruction to the dictionary server to update dictionary data comprising headwords and description contents, and the electronic dictionary terminal receives a new dictionary data comprising a headword corresponding to the retrieval object word from the dictionary server.

Regarding a headword corresponding to a retrieval object word, an instruction for an update on a new network dictionary may be provided to a dictionary server upon confirmation by displaying, for example, the number of characters composing descriptive information and retrieval information similar to actual descriptive information. In addition, the network dictionary can be easily and securely received.

According to another embodiment of the present invention, an electronic dictionary terminal connected via a communication network to a dictionary server comprising a first storage device which stores items of dictionary data comprising headwords and description contents of the headwords, the electronic dictionary terminal comprises:

a second storage device which stores headwords and description contents of the headwords;

an input unit which inputs a retrieval object word;

a determining unit which determines whether a headword corresponding to the retrieval object word is stored in the second storage device;

a display device which displays the description contents of the headword corresponding to the retrieval object word and stored in the second storage device when the determining unit determines that the headword corresponding to the retrieval object word is stored in the second storage device;

a requesting unit which transmits the retrieval object word to the dictionary server and issues a retrieval request to the dictionary server to retrieve a headword corresponding to the retrieval object word and stored in the first storage device when the determining unit determines that the headword corresponding to the retrieval object word is not stored in the second storage device;

a receiving unit which receives retrieval information regarding the headword of an item or items of dictionary data corresponding to the retrieval object word in response to the retrieval request issued from the requesting unit; and a display which displays the retrieval information received by the receiving unit.

When the retrieval object word is not contained in the second storage device, individual retrieval information regarding the headword contained in a plurality of items of dictionary data may be displayed and easily compared with one another to confirm the plurality of items of dictionary data. Thereby, a new dictionary for the retrieval object word input by a user may quickly be known.

According to still another embodiment of the present invention, a dictionary server connected to an electronic dictionary terminal via a communication network, the dictionary server comprises:

a storage device which stores headwords and description contents of the headwords;

a retrieving unit which retrieves a headword corresponding to a retrieval object word received from the electronic dictionary terminal from the storage device;

a first transmitting unit which reads out description contents corresponding to the retrieved headword and transmits the read description contents to the electronic dictionary terminal; and a second transmitting unit which transmits dictionary data comprising a headword corresponding to the retrieval object word in response to an instruction from the electronic dictionary terminal.

Dictionary data containing the headword corresponding to the retrieval object word received from an electronic dictionary terminal may be transmitted easily and appropriately to an electronic dictionary terminal.

As described above, according to the present invention, when a retrieval word is input to perform retrieval access to an built-in memory of the dictionary terminal, if a headword matching the retrieval word is not contained in the built-in dictionary, retrieval access is then made to an appropriate network dictionary stored in the dictionary server, and information contained in the network dictionary may be transmitted easily and appropriately.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 7A to 7D each show a display screen in the dictionary retrieval processing performed by the dictionary terminal, in which FIG. 7A is a view showing a retrieval character input screen G1 when a word matching retrieval object characters is present in a dictionary, FIG. 7B is a view showing a retrieval character input screen G1*a* when a word matching retrieval object characters is not present in the dictionary in a network-unconnected mode, FIG. 7C is a view showing a retrieval object list screen G2 when a word matching retrieval object characters is not present in the dictionary in a network-connected mode of the PC-linked electronic dictionary 20, and FIG. 7D is a view showing a retrieval character input screen G1*a* when a word matching retrieval object characters is not present in the dictionary in the network-connected mode;

FIGS. 9A to 9F each show display operations in the electronic dictionary 20 or 30 in association with the network dictionary processing in the electronic dictionary system, in which FIG. 9A shows a network dictionary retrieval information screen G3*a* within a range of the number of network-dictionary free usage times, FIG. 9B is a view showing a network dictionary retrieval information screen G3*b* in the case of a network-dictionary pay usage, FIG. 9C is a view showing a network dictionary retrieval result information screen G4, FIG. 9D shows a network dictionary update information screen G5*a* within a network-dictionary free usage range, FIG. 9E shows a network dictionary update information screen G5*b* in the case of a network dictionary pay use, and FIG. 9F shows a network-dictionary-update purchase information input screen G6.

DETAILED DESCRIPTION OF THE INVENTION

Figure 1:
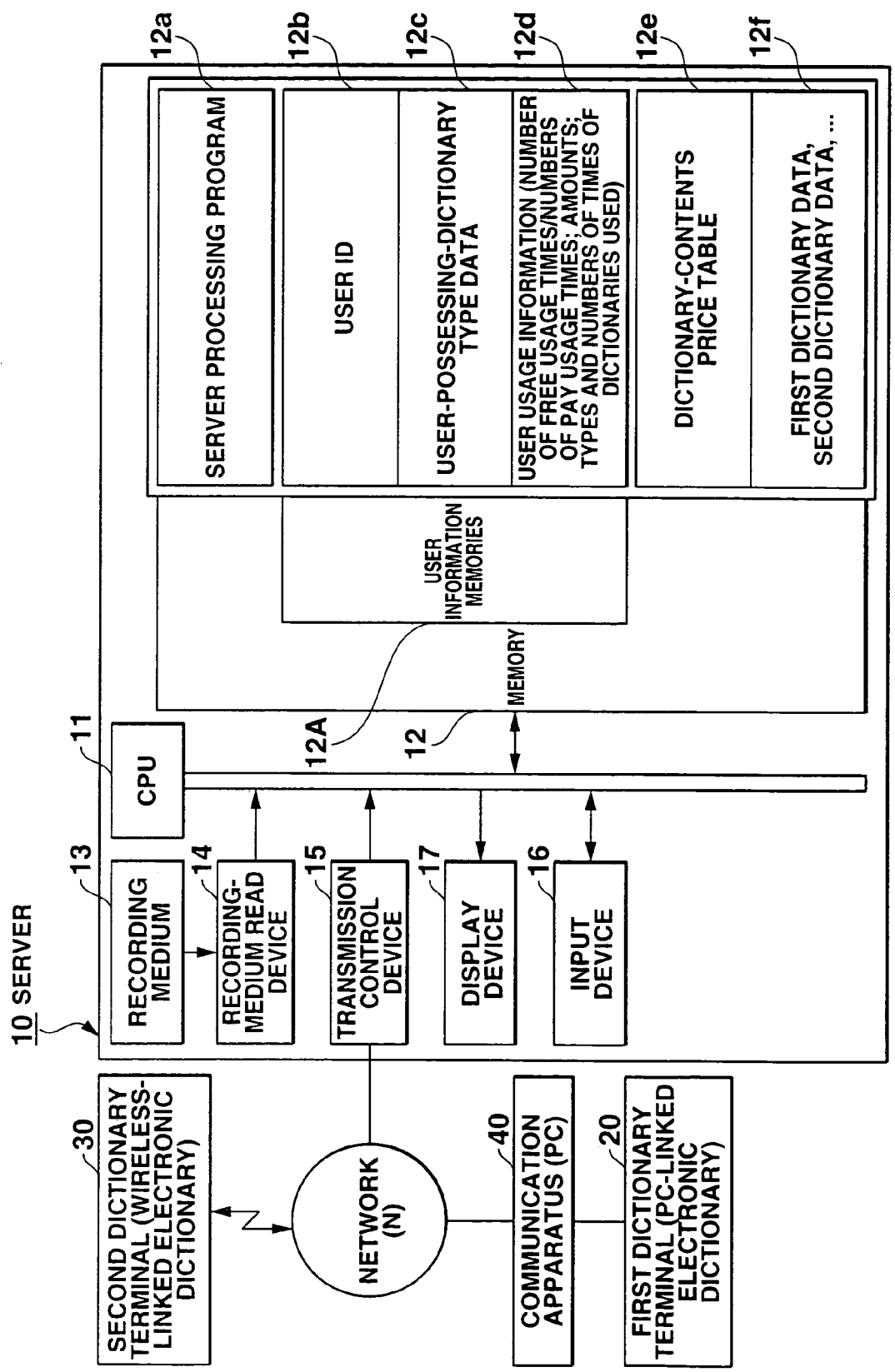
FIG. 1 is a block diagram showing the overall configuration of an electronic dictionary system and the configuration of an electronic circuit of a server thereof according to an embodiment of the present invention.

Embodiments of the present invention will be described hereinbelow referring to the drawings.

FIG. 1 is a block diagram showing the overall configuration of an electronic dictionary system and the configuration of an electronic circuit of a server thereof according to the embodiment of the present invention.

The electronic dictionary system includes a dictionary server 10 and terminals used as mobile terminals (PDAs:

personal digital assistants). The terminals include first dictionary terminals 20 (PC-linked electronic dictionaries) and second dictionary terminals 30 (wireless-linked electronic dictionaries).

The first dictionary terminals 20 are each connected by necessity to a communication apparatus 40, for example, a home-use personal computer (PC) of a user thereof, and are each connected thereby to the dictionary server 10 via a communication network N. The second dictionary terminals 30 are each connected by necessity to the dictionary server 10 via a communication network N in accordance with a wireless communication connection function that the second dictionary terminal 30 itself has.

The individual first dictionary terminal 20 and second dictionary terminal 30 have internally stored dictionary data of various types, such as English-Japanese dictionary data, Japanese-English dictionary data, and Japanese dictionary data, and each functions as an electronic dictionary.

Hereinafter, the first dictionary terminal 20 will be referred to as a "PC-linked electronic dictionary," the second dictionary terminal 30 will be referred to as "wireless-linked electronic dictionary," and the communication apparatus 40 will be referred to as a "home-use PC."

The dictionary server 10 includes a computer that reads programs stored in recording media of various types or transmitted programs and that controls the operation under the read programs. The electronic circuit of the computer has a CPU 11 (central processing unit).

The CPU 11 controls operations of individual circuit sections in accordance with a server control program prestored in a memory 12, a server control program read into the memory 12 via a recording-medium read device 14 from an external recording medium 13 such as a CD-ROM, or a server control program read into the memory 12 via a transmission control device 15 from a web server (program server in this case) in the communication network N (the Internet).

The server control programs stored in the memory 12 are individually activated in response to communication signals used for communication with the PC-linked electronic dictionary 20 (via the home-use PC 40) or wireless-linked electronic dictionary 30 in the communication network N (the Internet) connected via the transmission control device 15. Alternatively, these programs are activated in response to communication signals used for communication with other individual web servers, or are activated in response to input signals that correspond to operations performed by operators and that are received from an input device 16 formed of keys, a mouse, and a touch panel, for example.

The CPU 11 is connected not only to the memory 12, the recording-medium read device 14, the transmission control device 15, the input device 16, but also to other units such as a display device 17.

Stored in the memory 12 are, for example, system programs that control the overall operation of the dictionary server 10, and communication programs that perform data communication with the individual electronic dictionaries 20 and 30 in the communication network N (the Internet) via the transmission control device 15. Also stored therein is, for example, a server processing program 12a that performs dictionary retrieval processing and transmission processing for various retrieval information in response to dictionary retrieval requests received from the individual electronic dictionaries 20 and 30, dictionary-data download processing in response to dictionary update requests, and accounting processing.

The memory 12 includes a plurality of user information memories 12A corresponding to individual users possessing, for example, the PC-linked electronic dictionary 20 or the wireless-linked electronic dictionary 30. Each of the user information memories 12A stores a user ID 12b storing a corresponding user ID; a user's dictionary type data 12c storing data of the type and name of each dictionary built into the electronic dictionary 20 or 30 of the user; and user usage information 12d indicating numbers of free/pay usage times, usage amounts, and the types and the numbers of usage times of used dictionaries in association with the server-dictionary retrieval performed by the user's electronic dictionary 20 or 30.

Stored also in the memory 12 are, for example, dictionary contents price information 12e storing data of distribution prices of all individual dictionaries prepared in the dictionary server 10, and first, second, . . . dictionary data 12f of all the individual dictionaries prepared in the dictionary server 10.

Figure 2:
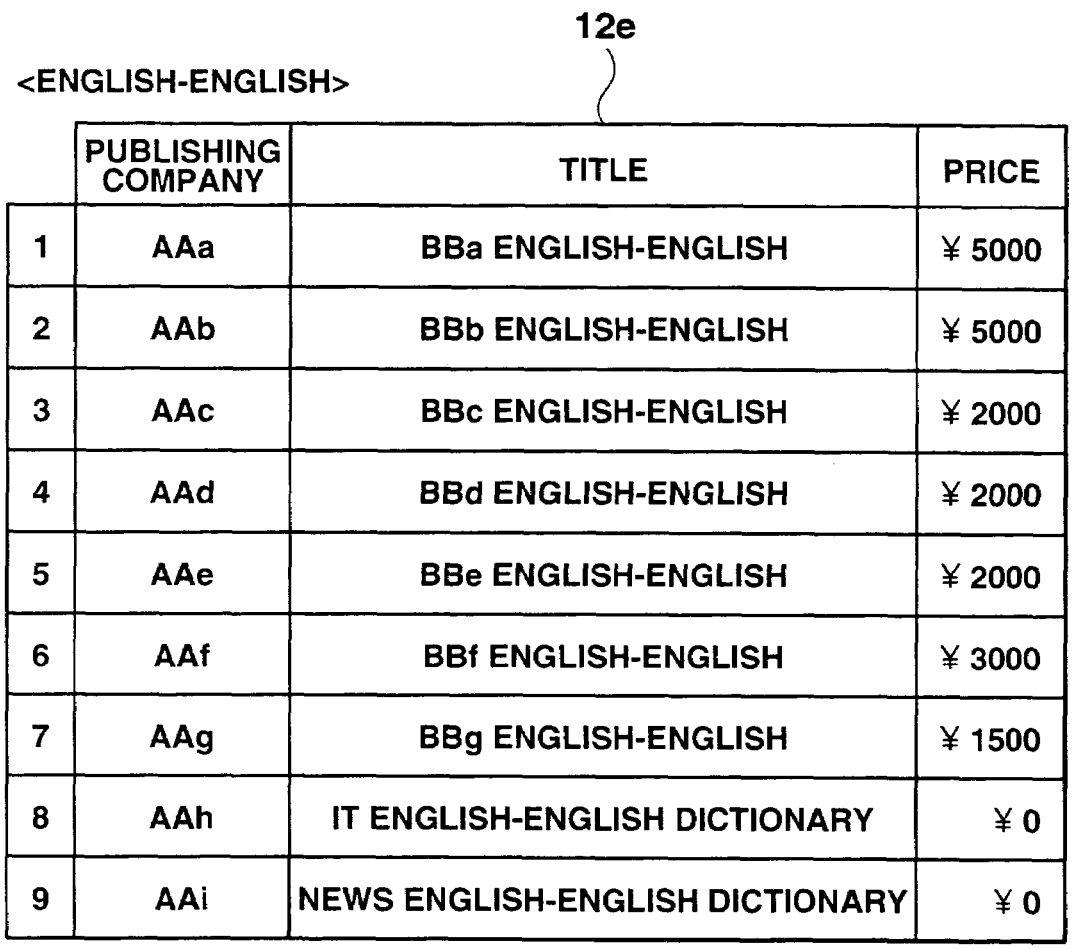
FIG. 2 shows an English-Japanese dictionary price table by way of an example of dictionary-contents price information stored in a memory 12 of the server 10 in the electronic dictionary system.

FIG. 2 shows an English-English dictionary price table by way of an example of the dictionary contents price information 12e stored in the memory 12 of the electronic dictionary system.

In the English-English dictionary price table 12e, distribution prices of download contents distribution to the individual electronic dictionary 20 and 30 are described in association with publishing companies and titles of all individual English-English dictionaries prepared in the dictionary server 10.

The dictionary price tables 12e are prepared for dictionaries of various categories other than the English-English dictionary shown in FIG. 2, including English-Japanese dictionaries, Japanese-English dictionaries, Japanese dictionaries, Chinese-character dictionaries, thesauruses, archaic word dictionaries, and technical dictionaries.

Figure 3:
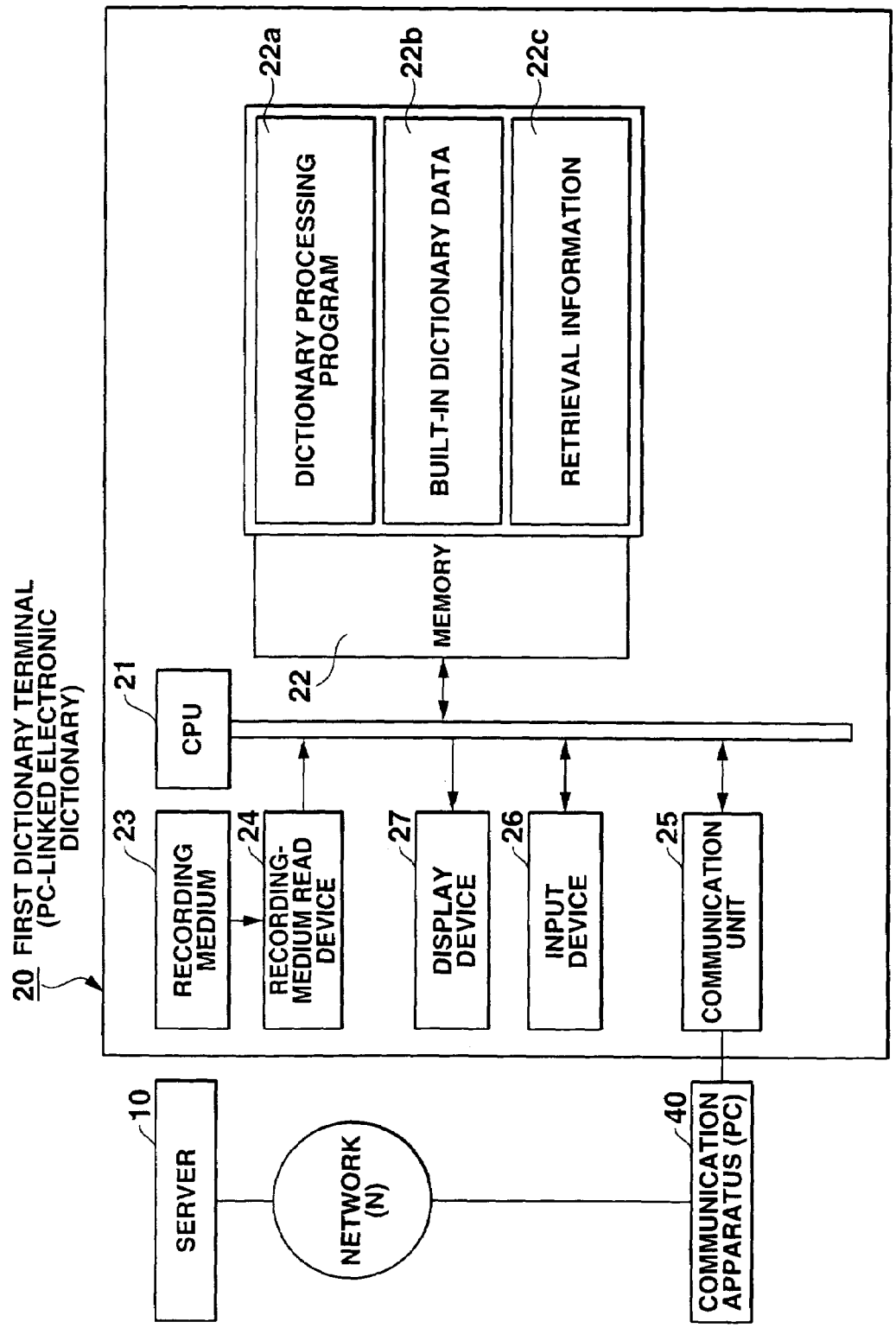
FIG. 3 is a block diagram showing the configuration of an electronic circuit of a first dictionary terminal 20 (PC-linked electronic dictionary) in the electronic dictionary system.

FIG. 3 is a block diagram showing the configuration of an electronic circuit of the PC-linked electronic dictionary 20 in the electronic dictionary system.

The PC-linked electronic dictionary 20 includes a computer that reads programs stored in recording media of various types or transmitted programs and that operates under the control of the read programs. The electronic circuit of the computer has a CPU 21 (central processing unit).

The CPU 21 controls operations of individual circuit sections in accordance with a mobile apparatus program prestored into a memory 22, a mobile-apparatus control program read into the memory 22 via a recording-medium read device 24 from an external recording medium 23 such as a ROM card, or a mobile-apparatus control program read into the memory 22 via the home-use PC 40 and a communication unit 25 from a web server (program server in this case) in the communication network N (the Internet).

The mobile-apparatus control programs stored in the memory 22 are individually activated in response to input signals that correspond to operations performed by operators and that are received from an input device 26 formed of keys and a touch panel, for example. Alternatively, the programs are activated in response to communication signals used for communication with the dictionary server 10 in the communication network N (the Internet) connected to the communication unit 25 via the home-use PC 40, or are activated in response to communication signals used for communication with other individual web servers.

The CPU 21 is connected not only to the memory 22, the recording-medium read device 24, the transmission control device 25, the input device 26, but also to other portions such as a display device 27.

Stored in the memory 22 are, for example, system programs that control the overall operation of the PC-linked electronic dictionary 20, and communication programs that perform data communication with the home-use PC 40 via the communication unit 25 and with the dictionary server 10 in the communication network N (the Internet) via the home-use PC 40. Also stored therein is, for example, a dictionary processing program 22a that performs dictionary retrieval processing for data in each built-in dictionary, and network dictionary processing such as sending dictionary retrieval requests and dictionary update requests to the dictionary server 10.

Further stored in the memory 22 are, for example, contents data 22b (built-in dictionary data) of each dictionary built into the electronic dictionary 20, and retrieval information 22c formed of a listing of retrieval object words when a retrieval word with respect to a dictionary stored in the dictionary data memory 22 is not stored therein.

Figure 4:
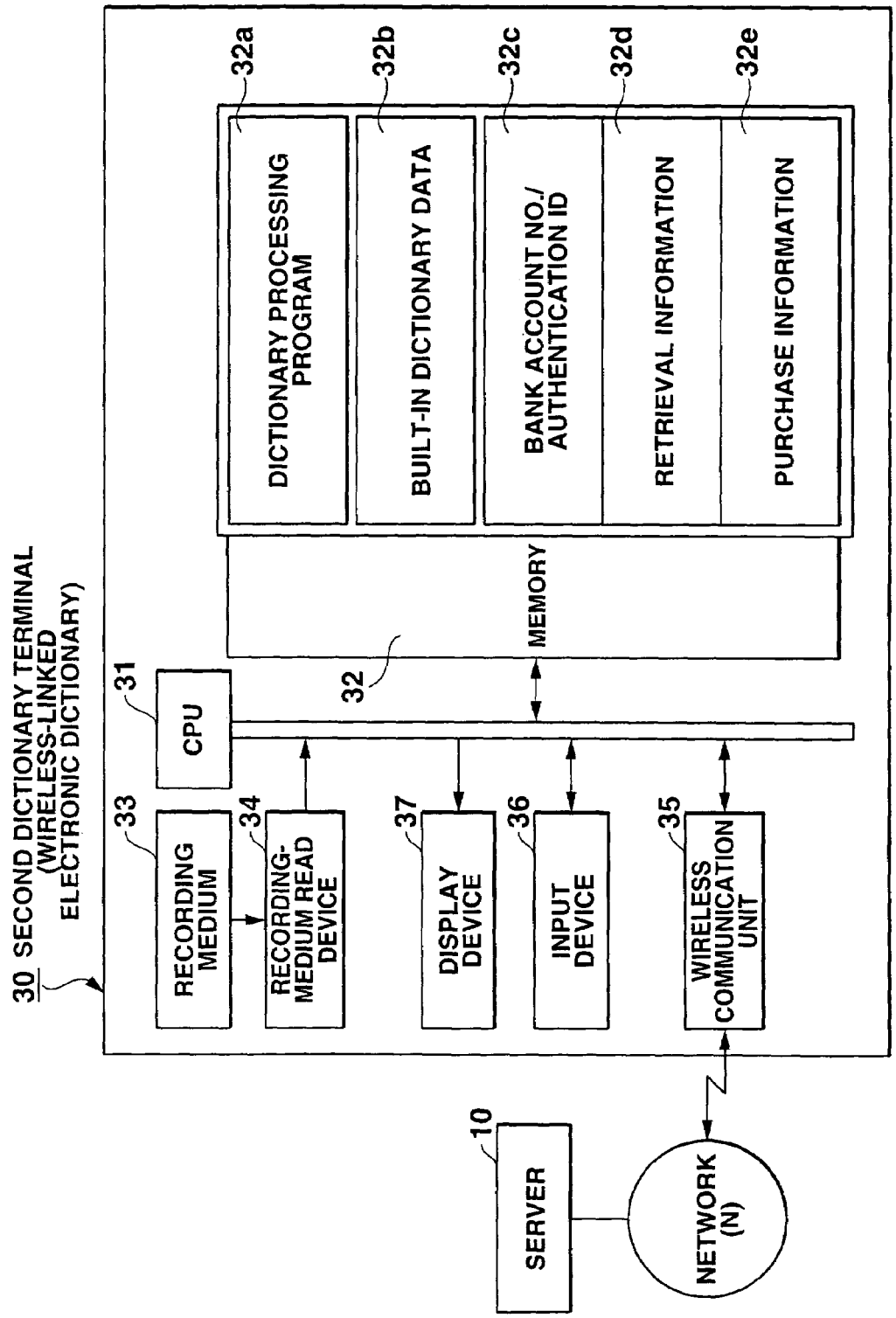
FIG. 4 is a block diagram showing the configuration of an electronic circuit of a second dictionary terminal 30 (wireless-linked electronic dictionary) in the electronic dictionary system.

FIG. 4 is a block diagram showing the configuration of an electronic circuit of the wireless-linked electronic dictionary 30 in the electronic dictionary system.

The wireless-linked electronic dictionary 30 includes a computer that reads programs stored in recording media of various types or transmitted programs and that operates the control under the read-in programs. The electronic circuit of the computer has a CPU 31 (central processing unit).

The CPU 31 controls operations of individual circuit sections in accordance with a wireless-mobile-apparatus control program prestored in a memory 32, a wireless-mobile-apparatus control program read into the memory 32 via a recording-medium read device 34 from an external recording medium 33 such as a ROM card, or a wireless-mobile-apparatus control program read into the memory 32 via a wireless communication unit 35 from a web server (program server in this case) in the communication network N (the Internet).

The wireless-mobile-apparatus control program stored in the memory 32 are individually activated in response to input signals that correspond to operations performed by operators and that are received from an input device 36 formed of keys and a touch panel, for example. Alternatively, the programs are activated in response to communication signals used for communication with the dictionary server 10 in the communication network N (the Internet) connected via the communication unit 35, or are activated in response to communication signals used for communication with other individual web servers.

The CPU 31 is connected not only to the memory 32, the recording-medium read device 34, the wireless communication unit 35, the input device 36, but also to other portions such as a display device 37.

Stored in the memory 32 are, for example, system programs that control the overall operation of the dictionary server 30, and communication programs that perform data communication with the dictionary server 10 in the communication network N (the Internet) via the wireless communication unit 35. Also stored therein is, for example, a dictionary processing program 32a that performs dictionary retrieval processing with respect to built-in dictionaries, and network dictionary processing such as sending dictionary retrieval requests and dictionary update requests to the dictionary server 10, similar to the case of the PC-linked electronic dictionary 20.

Further stored in the memory 32 are, for example, built-in dictionary data 32b formed of contents data of each dictionary built into the electronic dictionary 30; personal information 32c formed of bank accounts and authentication ID numbers of users of the electronic dictionary 30; retrieval information 32d formed of a listing of retrieval object words when a retrieval word in association with retrieval with respect to a dictionary stored in the dictionary data memory 32 is not stored therein; purchase information 32e including, for example, the dictionary name, the number of retrieval characters, and the purchase price of each dictionary containing a retrieval object word reported from the dictionary server 10 in association with the dictionary retrieval with respect to the dictionary server 10.

Because the electronic dictionaries 20 and 30, which are of a small and mobile type, do not have large-scale memories. Therefore, the built-in dictionary data 22b of the PC-linked electronic dictionary 20 and the built-in dictionary data 32b of the wireless-linked electronic dictionary 30 each contain, for example, one each of plural types of dictionaries, such as English-English dictionaries, English-Japanese dictionaries, Japanese-English dictionaries, and Japanese dictionaries.

The home-use PC 40 includes a communication unit that implements connective communication with the PC-linked electronic dictionary 20 and a transmission control device that implements connective communication with, for example, the dictionary server 10 and other individual web servers in the communication network N (the Internet), thereby functioning as a relay unit to connect the PC-linked electronic dictionary 20 and the dictionary server 10.

Operation of the electronic dictionary system configured as above will now be described hereinbelow.

Figure 5:
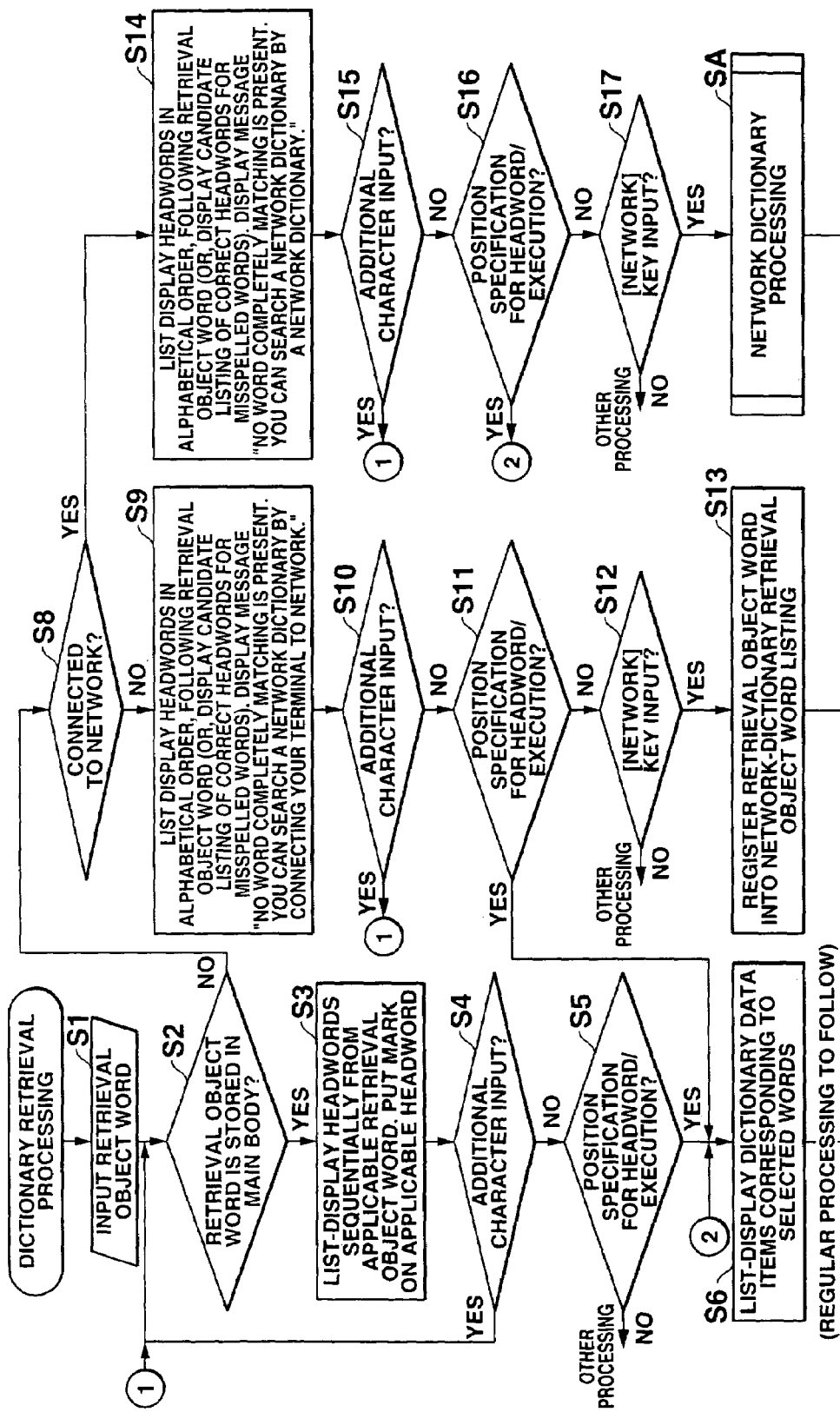
FIG. 5 is a flowchart showing dictionary retrieval processing performed by the dictionary terminal in the electronic dictionary system.

FIG. 5 is a flowchart showing dictionary retrieval processing performed by the electronic dictionary 20 or 30.

Figure 6:
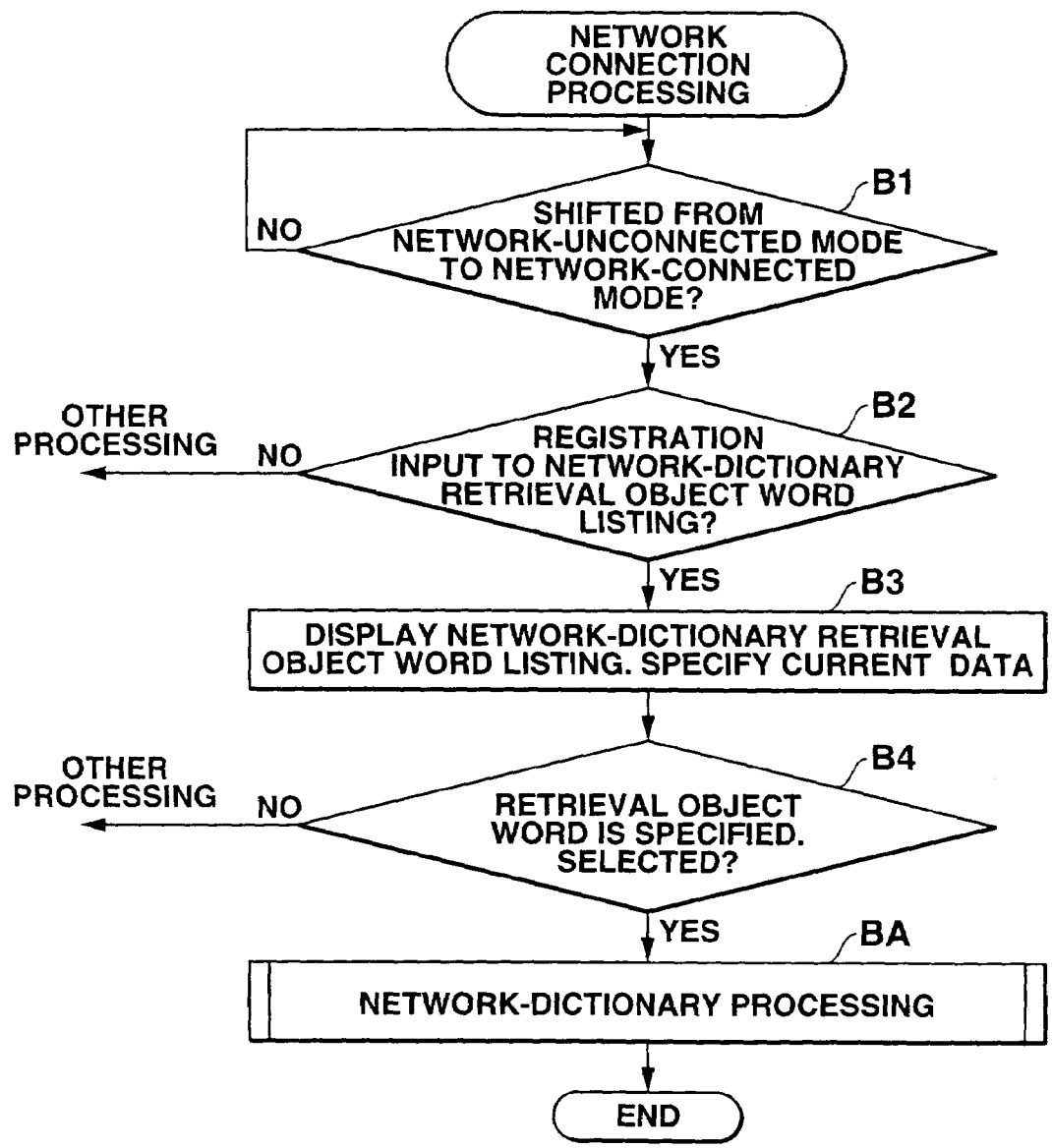
FIG. 6 is a flowchart showing network connection processing performed by the dictionary terminal in the electronic dictionary system.

FIG. 6 is a flowchart showing network connection processing performed by the PC-linked electronic dictionary 20 in the electronic dictionary system.

Figure 7A:
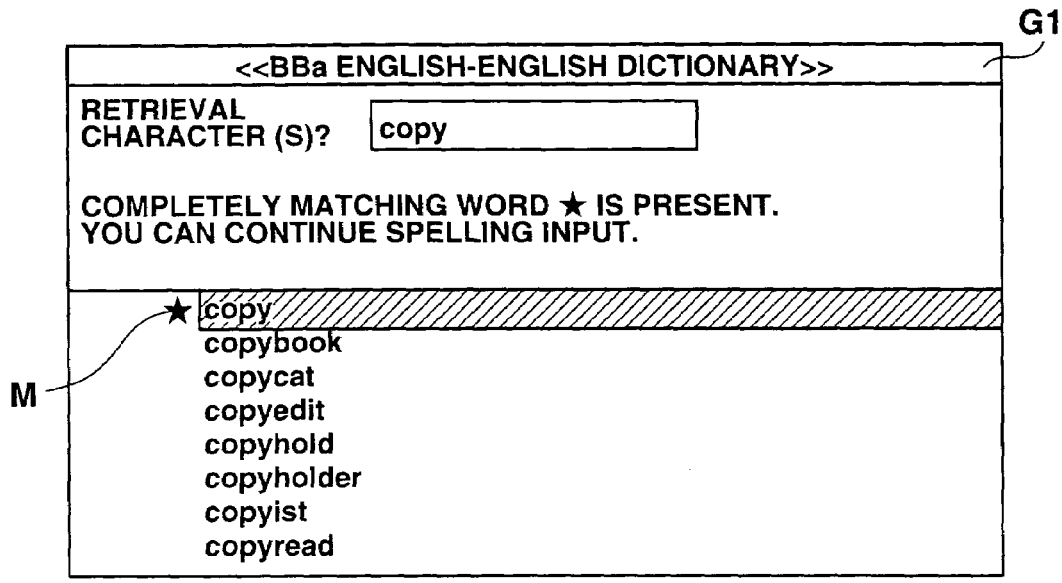
Figure 7B:
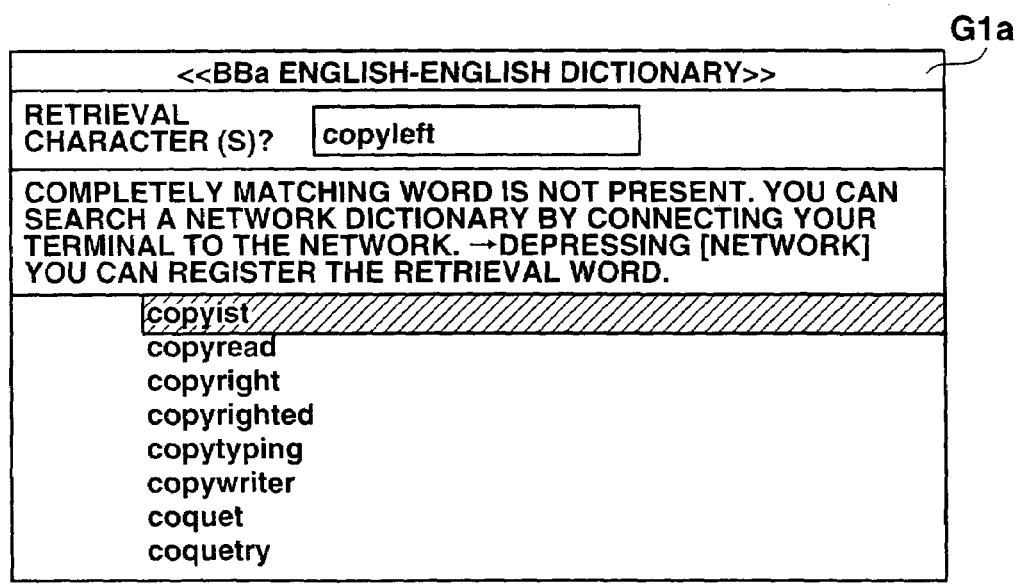
Figure 7C:
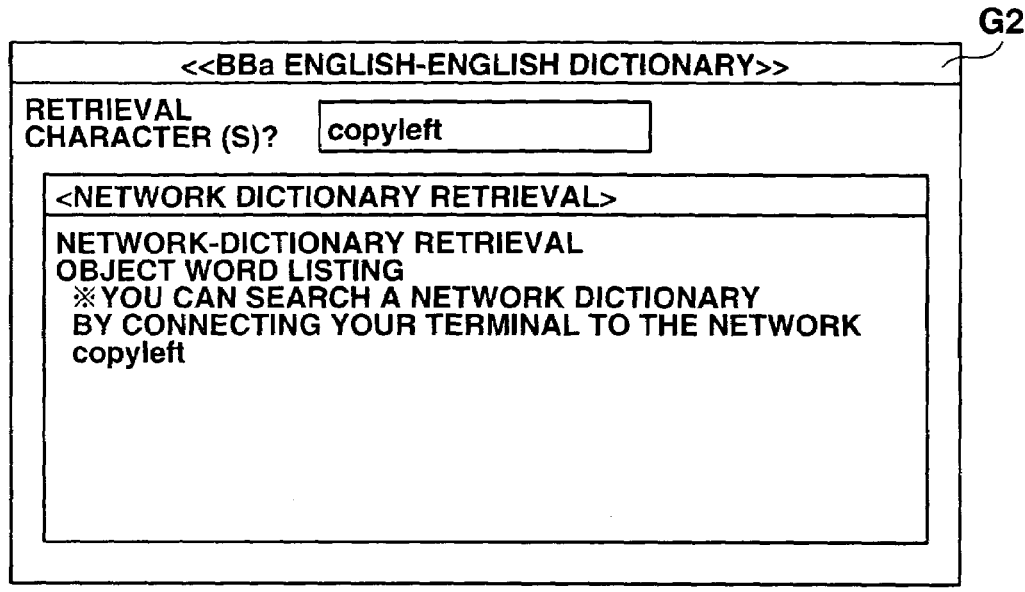
Figure 7D:
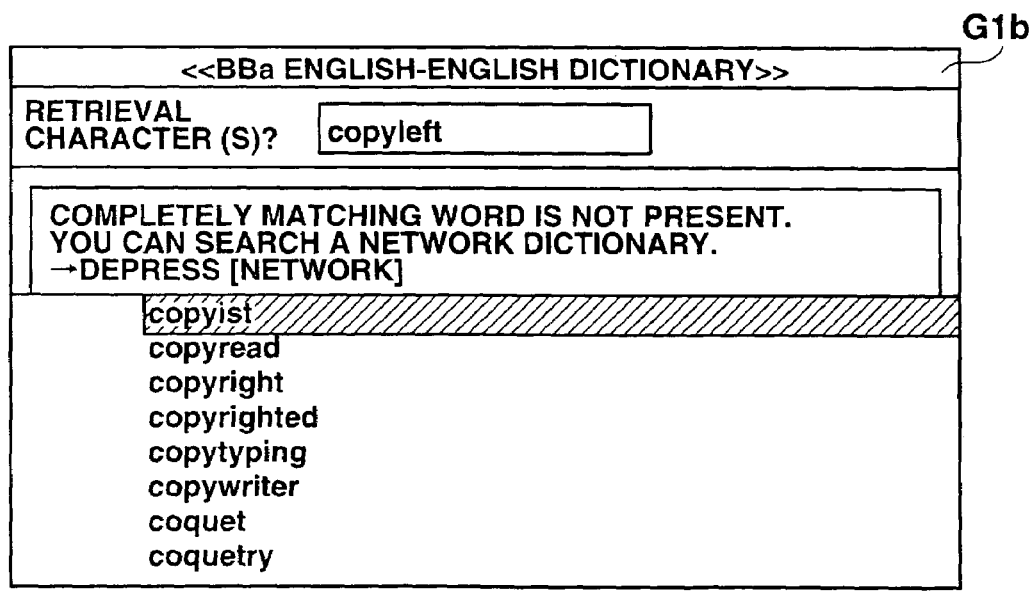

FIGS. 7A to 7D each show a display screen in the dictionary retrieval processing performed by the dictionary terminal. FIG. 7A is a view showing a retrieval character input screen G1 when a word matching retrieval object characters is present in a dictionary; FIG. 7B is a view showing a retrieval character input screen G1a when a word matching retrieval object characters is not present in the dictionary in the network-unconnected mode; FIG. 7C is a view showing a retrieval object list screen G2 when a word matching retrieval object characters is not present in the dictionary in the network-connected mode of the PC-linked electronic dictionary 20; and FIG. 7D is a view showing a retrieval character input screen G1a when a word matching retrieval object characters is not present in the dictionary in the network-connected mode.

Figure 8A:
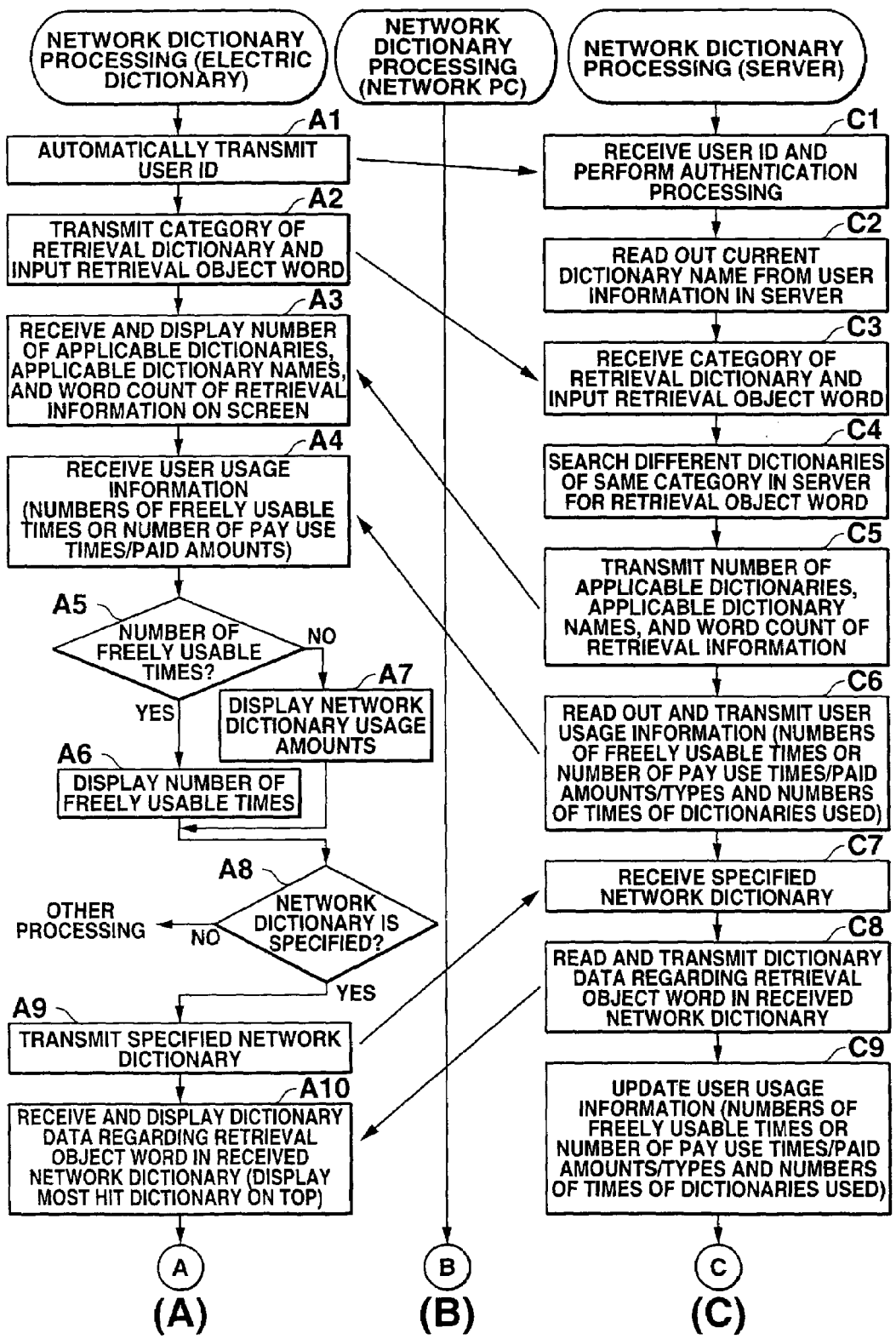
FIG. 8A is a flowchart showing network dictionary processing (first half) performed by the dictionary terminal or dictionary server in the electronic dictionary system.
Figure 8B:
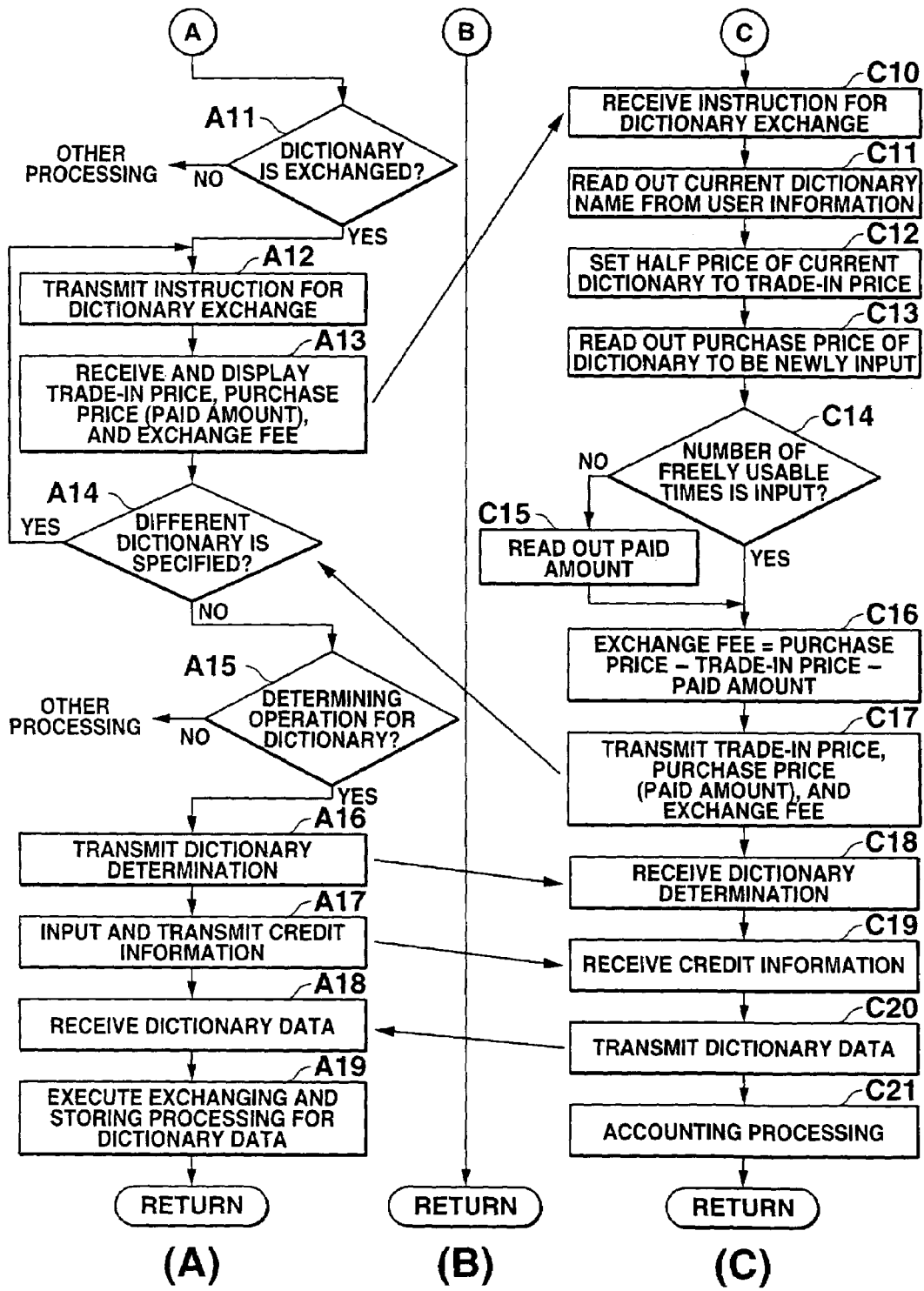
FIG. 8B is a flowchart showing network dictionary processing (second half) performed by the dictionary terminal or dictionary server in the electronic dictionary system.

FIGS. 8A and 8B are each a flowchart showing network dictionary processing performed by the dictionary terminal or dictionary server in the electronic dictionary system.

After the electronic dictionary 20 or 30 starts the dictionary retrieval processing shown in FIG. 5, an retrieval object word (characters) such as "copy" is input on the retrieval character input screen G1 displayed on the display device 26 or 36 (step S1). Then, it is determined whether the dictionary data 22b or 32b contains the input retrieval object (step S2).

If a headword matching the input retrieval object word is detected from the dictionary data 22b or 32b built into the main body, and it is determined that a matching word is stored, the retrieval character input screen G1 shown in FIG. 7 is displayed. In the screen G1, a listing of headwords in the order from the word matching the retrieval object word "copy" to similar words, as "copy," "copybook," and "copycat," is displayed and a retrieval match mark M is added to the headword "copy" (steps S2→S3).

If an additional character is input for the retrieval object word, the processing returns to the process of step S2 to determine whether the retrieval object word including the additional input is stored in the dictionary data 22b or 32b built into the main body (steps S4→S2).

At step S3, the retrieval character input screen G1 displays the listing of the headword matching the input retrieval object word and the headwords similar thereto. If a position of any one of the headwords in the listing is specified and an execution is performed therefor (step S5), a dictionary data entry corresponding to the headword (word) selected through the specification of the headword position is read out from the dictionary data 22b or 32b, and description contents thereof together with the retrieval object word are displayed on the display device 27 or 37 (step S6).

If at step S2 a headword matching the retrieval object word "copyleft" is not retrieved from the dictionary data 22b or 32b built into the main body and it is determined that the word is not stored, it is determined whether the electronic dictionary 20 or 30 is connected to the communication network N (the Internet) (step S8).

If the electronic dictionary 20 or 30 is not connected to the network, the retrieval character input screen G1a displays the message "A completely matching word is not present. You can search a network dictionary by connecting your terminal to the network.→Depressing "Network," you can register the retrieval word." Further, the screen G1a displays a candidate listing of headwords similar to the retrieval word, as "copyist," "copyread," "copyright," and so on, as shown in FIG. 7B (steps S8→S9). In addition, as shown in FIG. 7B, the retrieval character input screen G1a displays the headwords "copyist," "copyread," "copyright," and so on, which are sequentially similar in spelling to the retrieval object word, as the candidate listing of correct headwords with respect to input error (misspelling).

On the retrieval character input screen G1a being displayed, if an additional character is input with respect to the retrieval object word, the processing returns to the routing starting from step S2 in a manner similar to the above, and it is determined whether the additionally input retrieval object word is stored in the dictionary data 22b or 32b built into the main body (steps S10→S2)

On the retrieval character input screen G1a being displayed in the network-unconnected mode, if a position of any one of the list-displayed headwords "copyist," "copyread," "copyright," and so on is specified and an execution operation is performed therefor (step S11) in a manner similar to the above, a dictionary data entry corresponding to the headword (word) selected through the specification of the headword position is read out from the dictionary data memory 22b or 32b, and description contents thereof together with the retrieval object word are displayed on the display device 27 (step S6).

On the retrieval character input screen G1a being displayed in the network-unconnected mode, if a "Network" key provided in the input device 26 is operated (step S12), the retrieval object word "copyleft" currently input and displayed on the retrieval character input screen G1a as a headword having no completely matching headword is registered into retrieval information (network-dictionary retrieval object listing) 22c or 32d (step S13).

In this manner, the retrieval object word "copyleft" having no completely matching headword is registered into the retrieval information 22c or 32d in the form of the network-dictionary retrieval object listing of the respective electronic dictionaries 20 or 30. Then, the PC-linked electronic dictionary 20 is connected to the home-use PC 40. Alternatively, if a wireless communication function of the wireless-linked electronic dictionary 30 is turned ON, network connection processing shown in FIG. 6 is started. A first, it is determined whether the mode is shifted from the network-unconnected mode to the network-connected mode (step B1).

It is determined that the mode is shifted to the network-connected mode if the PC-linked electronic dictionary 20 is connected to the home-use PC 40. Alternatively, it is determined that the mode is shifted to the network-connected mode if the turn-ON operation is performed for the wireless communication function. In this case, it is determined whether a retrieval object word having no completely matching headword is registered into the retrieval information 22c or 32d (network-dictionary retrieval object listing) (step B1→B2).

If it is determined that a retrieval object word having no completely matching headword is registered in the retrieval information 22c or 32d (network-dictionary retrieval object listing), as shown in FIG. 7C, the currently registered retrieval object word "copyleft" in the network-dictionary retrieval object listing is designated and displayed on the retrieval object list screen G2 (steps B2→B3).

On the retrieval object list screen G2, if the list-displayed retrieval object word "copyleft" having no completely matching headword is selected to be searched in a network dictionary (step B4), the processing shifts to network dictionary processing shown in FIGS. 8A and 8B (step BA).

In the dictionary retrieval processing, at step S8, if the electronic dictionary 20 or 30 is connected to the network, as shown in FIG. 7D, the retrieval character input screen G1b in the network-connected mode displays the message "A completely matching word is not present. You can search a network dictionary by connecting your terminal to the network.→Depressing "Network," you can register the retrieval word." The screen G1b concurrently displays a candidate listing of headwords similar to the retrieval word, as "copyist," "copyread," "copyright," and so on (steps S8→S14).

Even on the retrieval character input screen G1b, if an additional character is input with respect to the retrieval object word, the processing returns to the routing starting from step S2 in a manner similar to the above, and it is determined whether the additionally input retrieval object word is stored in the dictionary data built into the main body (steps S15→S2).

On the retrieval character input screen G1b being displayed in the network-connected mode, if a position of any one of the list-displayed headwords "copyist," "copyread," "copyright," and so on is specified and an execution operation is performed therefor (step S16) in a manner similar to the above, similar to the above, a dictionary data entry corresponding to the headword (word) selected through the specification of the headword position is read out from the dictionary data 22b or 32b, and description contents thereof together with the retrieval object word are displayed on the display device 27 or 37 (step S6).

On the retrieval character input screen G1b displayed in the network-unconnected mode, if a "Network" key provided in the input device 26 or 36 is operated to search a network dictionary for a retrieval object word "copyleft" having no completely matching keyword (step S17), the processing shifts to network dictionary processing shown in FIGS. 8A and 8B (step SA).

FIGS. 8A and 8B are each a flowchart showing network dictionary processing performed by the dictionary terminal or dictionary server in the electronic dictionary system.

FIGS. 9A to 9F each show display operations in the electronic dictionary 20 or 30 in association with the network dictionary processing of the electronic dictionary system. FIG. 9A shows a network dictionary retrieval information screen G3a within a range of the number of network-dictionary free usage times, FIG. 9B shows a network dictionary retrieval information screen G3b in the case of a network-dictionary pay usage, FIG. 9C shows a network dictionary retrieval information screen G4, FIG. 9D shows a network dictionary update information screen G5a within a network-dictionary free usage range, FIG. 9E shows a network dictionary update information screen G5b for a network dictionary pay usage, and FIG. 9F shows a network-dictionary-update purchase information input screen G6.

In the PC-linked electronic dictionary 20 or the wireless-linked electronic dictionary 30, the network dictionary processing for retrieving a retrieval object word (for example, "copyleft") having no completely matching headword is started. As a result, in the PC-linked electronic dictionary 20, a user ID stored into the home-use PC 40 is automatically transmitted to the dictionary server 10; and in the wireless-linked electronic dictionary 30, a user ID registered into the personal information 32c is automatically transmitted to the dictionary server 10 (step A1).

Then, the retrieval object word "copyleft" having no completely matching headword, which has been input through the electronic dictionary 20 or 30, and a retrieval dictionary category "English-English" therefor are transmitted to the dictionary server 10 (step A2).

In the dictionary server 10, the user ID transmitted from the electronic dictionary 20 or 30 is received, and the user of the electronic dictionary at the communication destination is identified for authentication in accordance with the user ID 12b stored in the user information memories 12A for individual users (step C1). Then, processing is performed to read out dictionary names of dictionaries currently built into the electronic dictionary 20 or 30 at the communication destination (step C2).

Upon receipt of the retrieval object word "copyleft" and the category "English-English" therefor, which have been transmitted from the electronic dictionary 20 or 30 (step C3), individual dictionary data of the "English-English" category in the dictionary data 12f are retrieved for the retrieval object word "copyleft" (step C4). Then, processing is performed to transmit information to the electronic dictionary 20 or 30, the information representing the number of dictionaries from which the headword matching the retrieval object word has been retrieved; individual dictionary names from which the headword has been retrieved; and the number of characters of the retrieval contents as retrieval information for the headword of the individual dictionaries (2 Sets "BBb English-English Dictionary: 100 characters" and "BBc English-English Dictionary: 10 characters") (step C5).

Processing is then performed to read out information stored in the user usage information 12d corresponding to the user, and the information is transmitted to the electronic dictionary 20 or 30 (step C6). The information represents numbers of free usable times or numbers of pay usage times, and usage amounts/use-completion amounts in association with the network dictionary retrieval performed by the electronic dictionary 20 or 30.

In the electronic dictionary 20 or 30, the information transmitted from the dictionary server 10 is received, which represents the number of dictionaries from which the headword matching the retrieval object word has been retrieved; individual dictionary names from which the headword has been retrieved; and the number of characters of the retrieval contents as retrieval information for the headword of the individual dictionaries (2 Sets "BBb English-English Dictionary: 100 characters" and "BBc English-English Dictionary: 10 characters"). Further, the received retrieval information is displayed on the network dictionary retrieval information screen G3a or G3b, as shown in FIG. 9A or 9B (step A3).

Then, the information transmitted from the dictionary server 10 is received, which represents the numbers of free usable times or the numbers of pay usage times, and the usage amounts/paid amounts in association with the network dictionary retrieval performed by the electronic dictionary 20 or 30 (step A4). When the usage information includes the number of freely usable times, the number of freely usable times (for example, three times) is displayed on the network dictionary retrieval information screen G3a (steps A5→A6). When the usage information does not include the number of freely usable times, the number of freely usable times (for example, 15 times), and the usage amount/paid amount (for example, "Yen 20 per time," and "Paid amount 300 Yen") is displayed on the network dictionary retrieval information screen G3b, as shown FIG. 9B (steps A5→A7).

On the network dictionary retrieval information screen G3a or G3b, if a specifying operation is performed to specify one of the names of the dictionaries ("BBb English-English Dictionary: 100 characters" and "BBc English-English Dictionary: 10 characters") each containing the headword matching the retrieval object word by reference to the word count thereof (step A8), the specified dictionary name ("BBb English-English Dictionary," for example) is transmitted to the dictionary server 10 (step A9).

The dictionary server 10 receives the selected dictionary name transmitted from the electronic dictionary 20 or 30 (step C7). Then, description contents corresponding to the retrieval object word "copyleft" are read out in accordance with dictionary data of the dictionary "BBb English-English Dictionary" in the dictionary data 12f, and are transmitted to the electronic dictionary 20 or 30 (step C8).

Update is then made for the usage information (the number of freely usable times or the number of pay usage times, the use-completion amount, the used dictionary name, and the number of usage times therefor) stored in the user usage information 12d (step C9).

If the number of freely usable times is "0," it is determined as pay usage, and accounting processing is performed using predetermined network-retrieval accounting processing in accordance with credit information of the user.

In the electronic dictionary 20 or 30, the network dictionary retrieval information screen G4 is displayed upon receipt of the dictionary data (description contents), transmitted from the dictionary server 10, which is related to the retrieval object word "copyleft." As shown in FIG. 9C, the display starts with the retrieval object word "copyleft," followed by "<<Computer>> Copyleft <<A copyright used for software freely distributed . . . " (step A10).

The network dictionary retrieval information screen G4 displays the message "The dictionary will be updated?" as a guide for update from the current built-in dictionary ("BBb English-English Dictionary," for example) without the record of the retrieval object word to the specified network dictionary "BBb English-English Dictionary," and "Yes" and "No" command buttons therefor.

Upon the update is specified through an input operation using the "Yes" button on the network dictionary retrieval information result screen G4 (step A11), a command for updating the specified dictionary, of which the description contents have already been displayed through the selection, is transmitted to the dictionary server 10 (step A12).

The dictionary server 10 receives the command for the updating of the dictionary to the specified dictionary from the electronic dictionary 20 or 30 (step C10). Then, the dictionary name ("BBa English-English Dictionary," for example) of the dictionary category "English-English" associated in the network dictionary retrieval in the present case is read out as a dictionary name on the side of the update source from the names of built-in dictionaries of the destination electronic dictionary 20 or 30, which are stored in the user-possessing-dictionary type data 12*c* corresponding to the user (step C11).

In accordance with an English-English dictionary price table (see FIG. 2) stored in the dictionary price table 12*e*, half the price (Yen 2,000) of the update-current dictionary "BBa English-English Dictionary" is set as a trade-in price (Yen 1,000) (step C12). Further, a purchase price (Yen 5,000) of the selected "BBb English-English Dictionary" to newly be input is read out (step C13).

It is determined whether the usage is within the number of freely usable times (step C14). If the usage is a pay usage, or is not within the number of freely usable times, the paid amount (300 Yen, for example) stored in the user usage information 12*d* is read out (step C15), an update fee (=purchase price−trade-in price−paid amount) of the dictionary is calculated (step C16).

The trade-in price, purchase price, paid amount, and update fee, which are associated in the dictionary update in the present case are transmitted to the electronic dictionary 20 or 30 (step C17).

In the electronic dictionary 20 or 30, the price information transmitted from the dictionary server 10, i.e., the trade-in price, the purchase price, the paid amount, and the update fee, which are associated in the dictionary update are received. Then, as shown in FIGS. 9D and 9E, the price information together with the update selection dictionary name and non-selection dictionary name ("BBb English-English Dictionary" and "BBc English-English Dictionary") are displayed on the network dictionary update information screen G5*a* within the network-dictionary free usage range or the network dictionary update information screen G5*b* in the network-dictionary pay usage (step A13).

When a dictionary name to be updated is specified again, the processing returns to the routine starting from the step A12, and a dictionary-update command for the reselected network dictionary is transmitted again (steps A14→A12).

The dictionary name to be updated is thus determined and an "execute" key provided in the input device 26 or 36 is operated in accordance with the network dictionary update information screen G5*a* or G5*b* (step A15). The name of the dictionary name to be updated is transmitted to the dictionary server 10 (step A16). Then, credit information input in accordance with the network-dictionary-update purchase information input screen G6 as shown in FIG. 9F is transmitted to the dictionary server 10 (step A17).

The dictionary server 10 receives the dictionary name to be updated and the credit information, which have been transmitted from the electronic dictionary 20 or 30 (steps C18 and C19). Then, dictionary data to be updated is read out from the dictionary data 12*f*, and is downloaded into the electronic dictionary 20 or 30 (step C20). Thereafter, accounting processing is executed on the update fee in accordance with the received user credit information (step C21).

The electronic dictionary 20 or 30 receives the dictionary data to be updated, which has been transmitted from the dictionary server 10 (step A18). Then, the dictionary data to be updated is stored in a manner that the dictionary data ("BBb English-English Dictionary," for example) is overwritten to the current dictionary data ("BBa English-English Dictionary," for example) stored in the dictionary data 22*b* or 32*b* (step A19).

If the contents of a dictionary built in the electronic dictionary 20 or 30 is insufficient to catch up with, for example, changes in the dictionary use by a user, advanced knowledge level of the user, and/or new words, headwords matching retrieval object words are not stored in the dictionary. According to the present embodiment, the contents of a desired dictionary containing the retrieval object words is selectively downloaded from the dictionary server 10 to update the built-in dictionary contents, and the updated contents can be stored again.

In dictionary retrieval processing by the electronic dictionary 20 or 30, if a headword matching a retrieval object word is not stored in a built-in dictionary data and hence is not retrieved, the retrieval object word without a stored matching word is registered in the form of a network-dictionary retrieval object listing. A network dictionary retrieval is thereafter performed through connection to the dictionary server 10, a dictionary into which the registered retrieval object word is stored is retrieved in the dictionary server 10, is transmitted to the electronic dictionary 20 or 30, and is displayed on the network dictionary retrieval information screen G3. Upon selection of the dictionary displayed on the network dictionary retrieval information screen G3, dictionary data (description contents) corresponding to the retrieval object word retrieved from the target of the selected dictionary in the dictionary server 10 is transmitted to the user electronic dictionary 20 or 30 and is displayed on the network dictionary retrieval information screen G4. When dictionary update is instructed, the update fee is calculated in the dictionary server 10, is transmitted, and is displayed on the network dictionary update information screen G5. Dictionary data is transmitted and downloaded, and built-in dictionary data is thereby updated and stored. Accordingly, for the built-in dictionary data, the dictionary contents into which unretrievable retrieval object words are stored can easily be downloaded and purchased from the dictionary server 10, and a current built-in dictionary can be updated and registered.

In dictionary retrieval processing with the electronic dictionary 20 or 30, even if a headword completely matching a retrieval object word is not stored in the built-in dictionary data, the retrieval object word and multiple headwords similar thereto in a spelling order are displayed on the retrieval character input screen G1*a* or G1*b* in the form of the candidate listing of proper headwords (retrieval object words) in terms of input spell error (misspelling). Therefore, even when a retrieval object word includes input spell error (misspelling), a proper headword is easily found and retrieved. Because network retrieval can be instructed on the same screen, when the retrieval object word is not properly present in the built-in dictionary according to the decision of the user, the network retrieval can be immediately performed.

According to the electronic dictionary system having the configuration described above, when network dictionary retrievals are performed by accessing the dictionary server 10 from the electronic dictionary 20 or 30, a predetermined number of usage times of the retrievals are set as free services, and subsequent retrievals are set as pay services to be charged in accordance with the user credit information. In this case, when a dictionary update is instructed, because the paid amount for network retrievals performed on the pay-usage basis is reduced from the update fee, the dictionary update services may be purchased without wasting the usage of the network dictionary retrievals performed on the pay-usage basis.

Further, because half the price of the current dictionary built into the electronic dictionary 20 or 30 is reduced from the update fee, the dictionary update services may be purchased even more frequently without matching the current dictionary.

In the electronic dictionary 20 or 30, when the dictionary data of the update-determined dictionary, which has been transmitted from the dictionary server 10, is received (step A18), the dictionary data is overwritten to the current dictionary data stored in the dictionary data memory 22b or 32b, and the current dictionary data is thereby updated and stored. However, it is possible to make the current dictionary data unusable instead to physically overwrite the current dictionary data.

While the current dictionary is updated into a different dictionary, the same dictionary instead of the different dictionary may be updated to be a revised version of the dictionary by adding words to the same dictionary. In this case, the update may be made by adding only revision portions to the current dictionary.

Various processings of the dictionary server 10 and electronic dictionary 20 or 30 in the electronic dictionary system of the embodiment may be stored in the external recording media 13, 23, and 33 for distribution, including memory cards (such as ROM cards and RAM cards), magnetic disks (such as floppy disks and hard disks), optical disks (such as CD-ROMs and DVDs), and semiconductor memories. Various processings include those for the dictionary retrieval processing with the electronic dictionary 20 or 30, as shown in the flowchart of FIG. 5; the network connection processing with the PC-linked electronic dictionary 20 in association with the dictionary retrieval processing, as shown in the flowchart of FIG. 6; the network dictionary processing with the electronic dictionary 20 or 30, as shown in a flowchart of FIGS. 8A and 8B; the communication transfer processing with the home-use PC for communication with the dictionary server 10 in association with the network dictionary processing with the electronic dictionary 20 or 30; and the network dictionary processing with the dictionary server 10. In this case, various computer terminals each including communication functions for communicating with the communication network N (the Internet) read the programs, which are stored in the external recording media 13, 23, and 33, into the memories 12, 22, and 32 through the recording-medium read devices 14, 24, and 34, whereby operations are controlled by the read programs. Thereby, the functions of the electronic dictionary system described in the embodiment can be implemented, and processing according to methods similar to those described above can be implemented.

The storage devices used to store dictionary data may be of a type that allows the data to be read by necessity into the memories 12, 22, and 32 for use. The dictionary data is stored not only in RAMs, flash ROMs, and other solid-state memories 12, 22, and 32 built into the individual main bodies, but the external recording media 13, 23, and 33 such as memory cards (ROM cards and RAM cards, for example), magnetic disks (floppy disks and hard disks, for example), optical disks (CD-ROMs and DVDs, for example), and semiconductor memories.

Data of the programs (program data) for implementing the individual methods can be transmitted as program codes over the communication network N (the Internet). The program data are retrieved from computer terminals connected to the communication network N (the Internet), thereby enabling the above-described functions of the electronic dictionary system to be implemented.

The present invention is not limited to the individual embodiments described above, but various changes and modifications may be made at practical application stages without departing from the spirit and scope of the present invention. Further, the individual embodiments include inventions at various stages, wherein various inventions can be extracted through appropriate combinations of the plurality of configuration elements disclosed herein. For example, in cases where even when some configuration elements are eliminated from the overall configuration elements shown in the individual embodiments and/or some configuration elements are combined with each other, the problems described in the section of problems to be solved by the present invention can be solved, and the advantages described in the section of advantages can be obtained, the configurations built by eliminating and/or combining the configuration elements can be extracted as inventions.

What is claimed is:

1. An electronic dictionary terminal that is connectable to a dictionary server via a communication network, the electronic dictionary terminal comprising:

a dictionary storage unit which stores dictionary data in which headwords and description content corresponding respectively to the headwords are associated with each other;

a headword input unit via which a retrieval object word is input;

a headword description display control unit which, when the retrieval object word corresponds to a headword in the dictionary data stored in the dictionary storage unit, performs control to read out and display the description content stored in the dictionary storage unit in association with the headword corresponding to the retrieval object word;

a receiving unit which, when the retrieval object word does not correspond to a headword in the dictionary data stored in the dictionary storage unit, sends the retrieval object word to the dictionary server, and receives from the dictionary server: (i) names of dictionaries stored by the dictionary server which contain a headword corresponding to the retrieval object word and (ii) for each of the dictionaries which contain the headword corresponding to the retrieval object word, a quantity of information corresponding to the headword in the dictionary;

a display control unit which displays, on a display, the received names of the dictionaries in order of the quantity of information corresponding to the headword in each of the dictionaries;

a selector which selects one of the dictionaries whose names are displayed by the display control unit in accordance with an operation by a user, and which sends an instruction to the dictionary server;

a network dictionary receiving unit which receives from the dictionary server, in response to the instruction sent by the selector, dictionary data containing the headword corresponding to the retrieval object word from the selected dictionary; and a dictionary display unit which displays, on the display, the dictionary data received by the network dictionary receiving unit.

2. The electronic dictionary terminal according to claim 1, further comprising a dictionary exchange unit which replaces the dictionary data stored in the dictionary storage unit with dictionary data of the dictionary selected by the selector, which is received by the network dictionary receiving unit.

3. A computer-readable recording medium having a computer program stored thereon that is executable by a computer of an electronic dictionary terminal, wherein the electronic dictionary terminal includes a dictionary storage unit which stores dictionary data in which headwords and description content corresponding respectively to the headwords are associated with each other, and wherein the electronic dictionary terminal is connectable to a dictionary server via a communication network, the program being executable by the computer to cause the computer to control the electronic dictionary terminal to perform functions comprising:

receiving an input of a retrieval object word via a headword input unit;

reading out and displaying the description content stored in the dictionary storage unit in association with the headword corresponding to the retrieval object word, when the retrieval object word corresponds to a headword in the dictionary data stored in the dictionary storage unit;

sending the retrieval object word to the dictionary server, and receiving: (i) names of dictionaries stored by the dictionary server which contain a headword corresponding to the retrieval object word and (ii) for each of the dictionaries which contain the headword corresponding to the retrieval object word, a quantity of information corresponding to the headword in the dictionary, when the retrieval object word does not correspond to a headword in the dictionary data stored in the dictionary storage unit;

displaying, on a display, the received names of the dictionaries in order of the quantity of information corresponding to the headword in each of the dictionaries;

selecting one of the dictionaries whose names are displayed in accordance with an operation by a user, and sending an instruction to the dictionary server;

receiving from the dictionary server via the network, in response to the instruction to the dictionary server, dictionary data containing the headword corresponding to the retrieval object word from the selected dictionary; and displaying, on the display, the dictionary data received from the dictionary server via the network.

* * * * *